Figure 1:
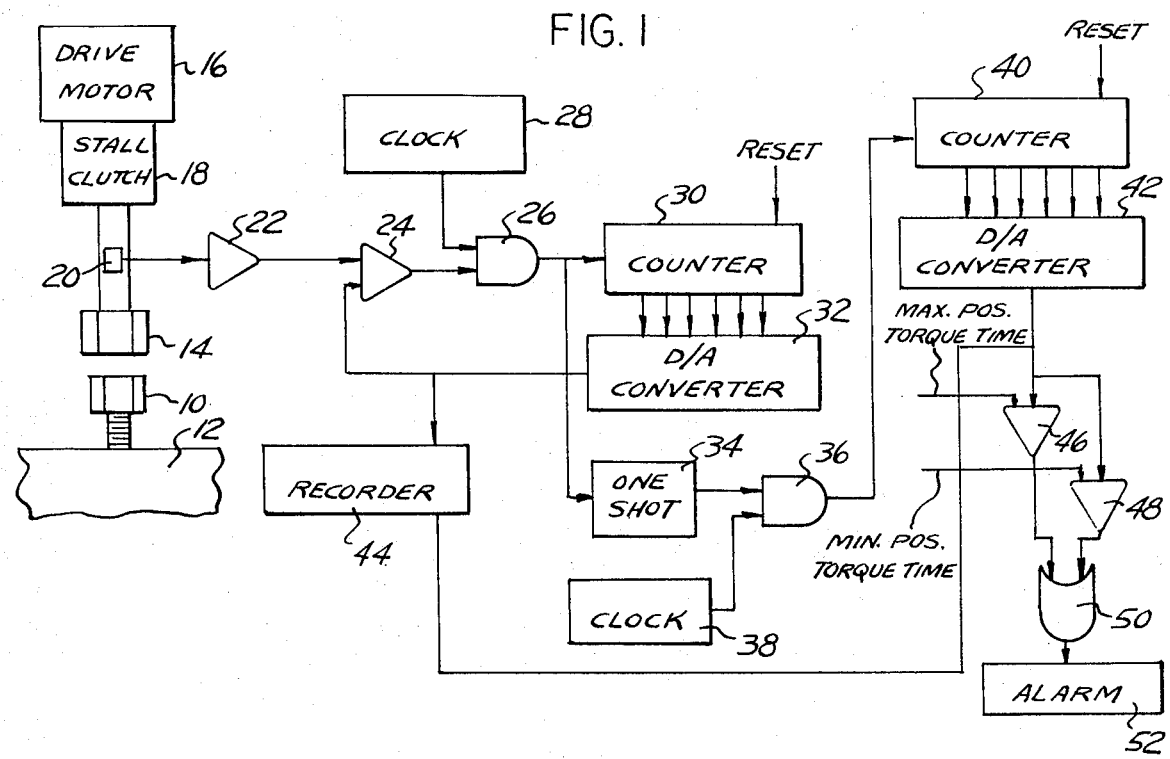

United States Patent [19]
Barnich

[11] 3,975,954
[45] Aug. 24, 1976

[54] METHOD AND APPARATUS FOR EVALUATING TORQUING OPERATIONS

[75] Inventor: Richard G. Barnich, Grand Blanc, Mich.

[73] Assignee: Process Computer Systems, Inc., Flint, Mich.

[22] Filed: Nov. 25, 1974

[21] Appl. No.: 526,691

[52] U.S. Cl. ................................. 73/139; 81/52.5
[51] Int. Cl.² ......................................... B25B 23/14
[58] Field of Search .......................... 73/88 F, 139; 81/52.4 A, 52.5

[56] References Cited
UNITED STATES PATENTS

| | | | |
|---|---|---|---|
| 3,821,991 | 7/1974 | Alexander | 81/52.5 X |
| 3,825,912 | 7/1974 | Wiese et al. | 81/52.5 X |

*Primary Examiner*—Charles A. Ruehl
*Attorney, Agent, or Firm*—Krass & Young

[57] ABSTRACT

To evaluate the quality of a torquing operation wherein a tool engages a workpiece and exerts a rotational driving force on the workpiece until a predetermined maximum torque is attained between the workpiece and the tool, the time during that torquing operation in which the torque actually being exerted by a tool on the workpiece exceeds the maximum torque previously exerted by the tool on the workpiece during the torquing operation is recorded. This value is then compared with previously established minimum and maximum values at such time as to detect an improper torquing action. The apparatus for recording this time includes a sensor connected to the tool which generates the signal proportional to instantaneous torque being exerted. A peak detector follows this signal as it increases and stores a value equal to the maximum torque previously exerted by the tool on a workpiece during the torquing operation. This value is compared with the instantaneous torque and the counting operation is enabled whenever the actual torque being exerted exceeds the previous maximum torque.

7 Claims, 2 Drawing Figures

METHOD AND APPARATUS FOR EVALUATING TORQUING OPERATIONS

BACKGROUND OF THE INVENTION

1. Field of the Invention.

This invention relates to a method of evaluating the quality of a torquing operation in which a rotary tool exerts force on a workpiece such as a threaded fastener and to apparatus for measuring the torquing operation to develop quantitative signals which may be used in the evaluation method.

2. Prior Art

In order to insure the proper setting of threaded fasteners such as nuts and bolts, it is common practice to establish a value for the maximum torque to be applied to the fastener by a torquing tool and to continue the torquing operation until this maximum value has been attained. Spring-loaded torque gages are available for measuring the torque imposed manually, with a wrench, and a variety of torque limiting devices are available for use on automatic equipment such as the hydraulic nut drivers commonly used in automobile assembly and the like. Torque limiting devices often include a hydraulic pressure limiting mechanism or a mechanical slip clutch to limit the torque. In other systems the torque is electronically monitored using a strain gage of other suitable force transducer and the driving power is electrically terminated when the predetermined maximum torque is achieved.

However, the imposition of a maximum predetermined torque on a threaded fastener does not in itself guarantee the quality of the fastener setting. For example, if the threads are improperly mated; i.e. crossed, at the outset of the torquing operation, the maximum torque may be quickly attained without any real closure of the fastener. If the instantaneous torque exerted on the fastener is plotted against the time of the torquing operation the curve for this crossed thread situation will be practically a vertical line sharply rising to the predetermined maximum torque at which driving force shut-off occurs. At the other extreme stripped threads on the fastener may result in a spinning of the workpiece for a long period of time at a very low torque until a thread mismatch occurs at which time the torque will rise sharply to the maximum value. Both of these operations appear satisfactory if maximum torque exerted during the operation is the only quality control criteria employed.

This situation immediately suggests that the time of the torquing operation be measured and employed as a quality control factor along with maximum torque. However, the time required to achieve maximum torque during the torquing operation is first of all dependent upon the initial state of the threaded fastener members and unless a high measure of care is exercised in preparing the fasteners for automatic assembly, there will be a substantial variation in the time required to attain maximum predetermined torque using automatic equipment, with different sets of the same fasteners. Additionally, a threaded fastener may bind slightly during a torquing operation yet still attain a good final set after sufficient torque is exerted, less than the maximum torque, to overcome this bind. The torque-time curve of this fastener will be characterized by a gradual increase in torque until the bind occurs, a sharp increase in torque at that time, a sharp drop-off of torque after the bind is cleared, and finally a gradual rise to the maximum predetermined torque.

I have determined that while the time required to perform the torquing operation is a relevant factor in evaluating its quality, a much more precise evaluation of quality is attained by a measurement of the time during a torquing operation when the instantaneous torque being applied exceeds the previous peak torque applied during the operation. That measurement might be termed the "positive torque-time". If a slight bind is encountered in setting the fastener, the time after the bind, while the torque first decreases and then increases to the previous maximum value, is not measured. I found that this criteria of "positive torque-time" is highly useful in evaluating the quality of a torquing operation.

SUMMARY OF THE INVENTION

The broad method of the present invention comprises establishing the standards for the positive torque time expended in a torquing operation; measuring the positive torque time expended in a torquing operation; and comparing that actual torque time with the predetermined criteria to determine the quality of the torque operation. The positive time criteria preferably takes the form of minimum and maximum limits established on the basis of experiment.

The apparatus of the present invention for deriving a quantitative measure of positive torque time broadly includes transducer or sensor means associated with the torquing tool for generating a signal proportional to the instantaneous torque being exerted on the workpiece; means for receiving the sensing signal and storing a value equal to the peak torque exerted by the tool previously during the operation; and means for comparing the sensor output with the stored peak to generating a signal proportional to the time the instantaneous signal exceeds the previous stored peak.

In the preferred embodiment of the invention, which will subsequently be disclosed in detail, the peak value is derived through digital circuitry which includes a counter and a first clock feeding the counter through a gate. The gate is conditioned by a comparator which receives a pair of analog signals from the instantaneous torque transducer and from a digital-analog convertor connected to the counter. Accordingly, the high rate clock pulses are fed into the counter whenever the instantaneous torque value exceeds the previous peak reached during the torquing operation as stored in the counter. The output of the gate also triggers a one-shot multi-vibrator having an output pulse width equal to several times the high frequency clock rate. This one-shot conditions a second gate which controls the application of pulses from a second clock into a second counter. The relatively high frequency of the first clock causes the first counter to closely track the torque peak. When the torque value is rising very sharply, high rate clock pulses are fed into the counter rapidly and when the torque value is rising at a slower rate, there is a peak torque counter. The longer period of a multi-vibrator, and the slower rate of the second clock makes the number of pulses fed into the second counter relatively independent of the rate of increase of the torque value but simply proportional to the time, during the torquing operation, in which the measured torque exceeds the previously attained peak torque.

In alternative embodiments of the invention other circuits could be used to record the peak torque attained during the cycle and to record the time during which the applied torque exceeds the previous peak torque. For example, an analog peak detector could be used instead of the more expensive, but relatively drift-free, digital counter and digital-analog converter.

The automatic shut-off of the driving forces at the predetermined maximum torque may be triggered by circuitry which receives the output of the torque sensor, compares that output with the predetermined maximum torque to generate a shut-off signal when the two are in accord. Alternatively, the shut-off mechanism may form part of the driving system and take the form of a stall clutch or hydraulic mechanism so as to be independent of the torque sensor.

The torque transducer itself may be of any well-known type such as a strain gage or optical sensor. The nature of the torque sensor performs no part of the instant invention.

Figure 2:
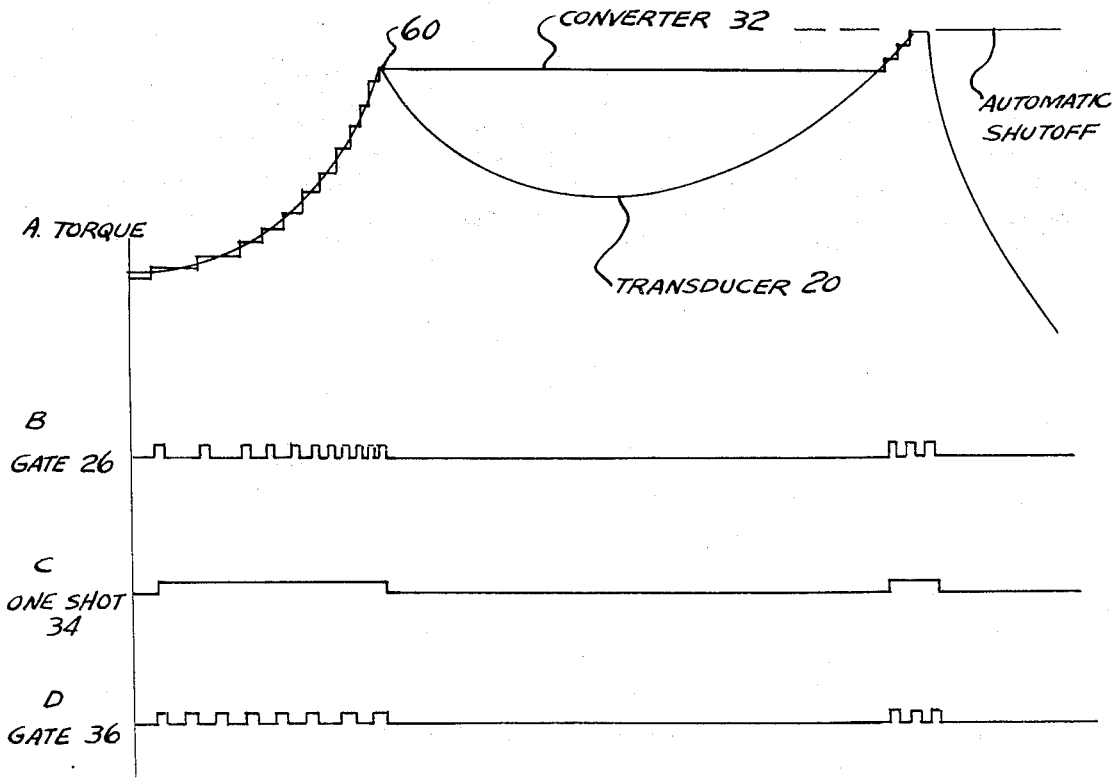

Other objectives, advantages and applications of the present invention will be made apparent by the following detailed description of a preferred embodiment of the invention. The description makes reference to the accompanying drawings, in which:

FIG. 1 is a schematic diagram of a mechanism for applying torque to a threaded fastener and for receiving, analyzing and recording the output of a torque transducer associated with the torquing mechanism, constituting a preferred embodiment of the invention; and FIG. 2 is a plot of wave forms occuring at various stages of the system of FIG. 1 during a torquing operation.

Referring to the drawings, the system of the present invention may be employed with any tool for applying torque to a workpiece but is more generally applicable to an automatic system for applying torque to a threaded fastener such as a bolt 10 to be threaded into a hole formed in a part such as an engine block 12. The torquing apparatus includes a wrench-like tool 14 for engaging the head of the bolt 10, a drive motor 16 for exerting a rotational force on the tool 14, and a stall clutch 18 operative to limit the torque applied by the drive motor to a predetermined maximum.

A transducer 20, preferably of the strain gage type, is affixed to the shaft between the stall clutch 18 and the tool 14 and provides an electrical signal proportional to the torque being exerted on the tool. As is conventional, the torque may be derived by measuring the flexure of the driving shaft.

The analog output signal from the strain gage transducer 20 is provided to a signal conditioning amplifier 22 and then fed into a voltage comparator 24. The output of the comparator 24 conditions an AND gate 26 which controls the application of pulses from a first clock 28 to a digital couonter 30. A digital-to-analog converter 32 connected to the output of the counter 30 converts its status into an analog voltage which forms the other input to the comparator 24.

Thus, the comparator 24 compares the instantaneous voltage output of the transducer 20 with a voltage proportional to the count stored in counter 30. At the beginning of a torquing operation, the counter 30 is reset to zero. Accordingly, the initial output of the transducer 20, as conditioned by the amplifier 22, exceeds the output of a digital-analog converter. Whenever this condition occurs an enabling signal is provided to the gate 26 so that the relatively rapid pulses form the clock 28 may be applied to the counter 30.

The count in the counter 30 will soon rise to a level which will produce an output from the digital analog-converter 32 exceeding the output of the transducer 20 and accordingly the gate 26 will be closed, preventing the further application pulses to the counter 30.

As the output of the transducer 20 continues to increase, it will reach a point where it again exceeds the voltage output of the digital-analog converter 32, and the gate 26 will again be opened. The clock pulses will thus be admitted to the counter 30 at a rate which is dependent upon the rate of increase of the signal from the transducer 20. If the torque being imposed upon the workpiece is increasing at a very gradual rate the intervals at which the gae 26 is opened to allow the application of pulses from the clock 28 to the counter 30 will be relatively widely spaced. If the torque signal is rising relatively rapidly, the increase in torque will quickly overcome the increase in output of the digital-to-analog converter 32 created by the application of an additional pulse to the counter 30 and the times between the application of pulses to the counter 30 will be relatively short.

If a point is reached in the torquing operation at which the torque applied to the workpiece decreases, as may occur, for example, when the mating threads temporarily bind and then overcome that bind as a result of the increasing applied torque, the gate 26 will not be opened until the applied torque again increases to a level which exceeds the highest torque previously applied. The counter 30 thus stores a count proportional to the maximum torque previously applied during the torquing operation which begins when a minimum level torque is applied by the tool 14 to the bolt 10 and which terminates when the torque required to cause the clutch 18 to stall is imposed.

The comparator 24, gate 26, clock 28, counter 30, and D/A converter 32 may collectively be considered means for receiving the output of the sensor and for storing a signal proportional to the peak torque exerted by the tool on the workpiece during the torquing operation.

The output of the gate 26 is also applied to a one-shot multi-vibrator 34. The multi-vibrator 34 has an output period that is substantially longer than the time period between two pulses from the clock 28. Preferably, the period of the one-shot multi-vibrator 32 will be about equal to five times the period of the clock 28. The outputs of the multi-vibrator 34 are applied to a gate 36 which conditions the applications of pulses from a second clock 38 to a digital counter 40. If the one-shot multi-vibrator 34 had the same period as the cycle of the clock 28, and the clock 38 had the same rate as the clock 28, the counter 40 would store a count substantially identical to the count stored in the count 30. However, because of the relatively long period of the one-shot multi-vibrator 34 relative to the clock 28, pulses from the clock 38 are applied to the counter 40 at a rate which is relatively independent of the rate of increase of the signal from the torque transducer 20. The same number of pulses are provided to the counter 40 during a given time period whether the signal from the transducer 20 is rising at a rapid rate or at a slow rate, as long as rate of increase is sufficient that the output of the gate 26 is not low for a period exceeding the output time of the multi-vibrator 34. The signal stored in the counter 40 thus differs from the signal stored in the counter 30; while the number in the counter 30 is proportional to the maximum torque imposed by the drive motor 16 on the tool 14 during the torquing operation, the count in the counter 40 is proportional to the time during which the output of the amplified torque signal exceeds the count in the counter 30, as converted to an analog voltage by converter 32. The comparator 24, the gate 26, the clock 28, the multi-vibrator 34, the clock 38, the gate 36 and the counter 40 may thus be collectively considered as means for receiving the output of the sensor and the output of the counter 30, and for generating a signal proportional to the time during the torquing operation during which the torque exerted by the tool on the workpiece exceeds the previous torque exerted by the tool on the workpiece during the torquing operation. While this subsystem shares some components with the subsystem for recording peak torque in alternative embodiments of the invention they could be separated.

Accordingly, at the end of the torquing cycle, that is when the torque applied by the drive motor 16 exceeds the value set in the clutch 18, the counter 30 will retain a count proportional to the maximum torque applied during the torquing operation and the counter 40 will contain a count proportional to the time during the torquing operation in which the torque being exerted by the tool on the workpiece exceeds the peak torque previously applied. The count in the counter 30 should be substantially the same at the end of a torquing cycle, independently of the shape of the torque-time curve; the count in the counter 40 conversely, will be highly dependent upon the shape of that curve.

The output of the counter 40 is preferably converted into an analog voltage by a digital-analog converter 42. The output of this converter 42 as well as the output of the converter 32 may be applied to an analog recorder 44 so as to retain a permanent record of the torquing operation, for later reference. The output of the converter 42 is also applied to a pair of comparators 46 and 48. The comparator 46 receives a reference value proportional to a maximum permissible torque time value as previously determined by experimental efforts. Accordingly, if the output of the digital analog converter 42, at the end of a torquing operation, is either greater than the maximum or less than the minimum positive torque time an output is applied to an OR gate 50 by the comparators 46 and 48 and an alarm signal 52 is generated. This alarm may be such as to instantaneously advise an inspector of the problem or to create a record which may be later referenced so that the bolt 10 may be re-examined.

FIG. 2 illustrates the operation of the circuitry of FIG. 1 with wave forms which may occur during a typical torquing operation.

FIG. 2A plots the output of the transducer 20 during the torquing cycle and superimposed thereon is the voltage generated by the converter 32. As shown at 2B, pulses applied by the gate 26 are outputted by the gate 26 at a rate proportional to the rate of increase of the torque signal as long as the instantaneous torque signal exceeds the previous maximum torque signal as represented by the voltage of converter 32. When the absolute torque begins to decrease, as at a point 60 on the curve of FIG. 2A, the converter signal 32 remains constant and the gate 26 discontinues the application of pulses to the counter 30. The one-shot multi-vibrator 34 provides a continuous output, illustrated in FIG. 2C, as long as the intervals between the pulses outputted by the gate 26 are less than the output cycle of the one-shot. Accordingly, the one-shot substantially provides an output as long as the transducer signal 20 exceeds the convertor signal 32. While the one-shot 34 will not track very fast reverses of the slope of the torqued signal, these are not characteristic of a torquing operation. As shown in FIG. 2D, the outputs from gate 36 are provided as long as the one-shot multi-vibrator 34 is providing an output. Thus the count in the counter 40 is proportional to the time at which the transducer signal 20 exceeds the peak torque signal 32 independently of the rate of increase of the torque signal.

Having thus described my invention, I claim:

1. A system for applying a torquing force to a workpiece, comprising: a tool for engaging the workpiece; a drive system for applying rotational force to the tool; means for terminating the application of driving force upon attainment of a predetermined torque on the workpiece; sensor means measuring the torque applied to the workpiece; means for recording the peak torque attained at any time during the torquing operation; and means for recording the duration of time during the torquing operation at which the torque applied to the workpiece exceeds the torque previously applied to the workpiece during the torquing operation.

2. The system of claim 1 wherein said means for recording the peak torque exerted during the torquing operation includes a digital counter, a clock, a gate connecting the output of the clock to the digital counter and a comparator operative to receive the output of said sensor means and a valve proportional to the count stored in the counter and to condition the gate to emit pulses from the clock to the counter at such time as the output of the sensor exceeds the count stored in the counter.

3. The system of claim 2 wherein said means for recording the duration of time during the torquing operation in which the torque applied to the workpiece exceeds the torque previously applied to the workpiece during the torquing operation includes a one-shot multi-vibrator having a time period substantially in excess of the clocking pulse of said clock; a second counter, a second gate conditioned by the output of the one-shot multi-vibrator; and means for providing pulses to the gate, to be applied to the second gate.

4. The system of claim 1 including means for comparing the duration of time during the torquing operation at which the torque applied exceeds the torque previously applied to the workpiece during the torquing operation with minimum and maximum values for such time and for generating an alarm signal at such time as the recorded time exceeds the maximum predetermined value or is lower than the minimum predetermined value.

5. A system for applying a torquing force to a workpiece, comprising: a tool for engaging the workpiece; a driving system for said tool; means for initiating driving action of the tool on the workpiece; means for terminating the driving action upon attainment of a predetermined torque force between the tool and the workpiece; and means for recording the duration of time between initiation of the torquing action and termination of the torquing action during which the torque exerted by the tool on the workpiece exceeds the torque previously exerted by the tool on the workpiece during the torquing operation.

6. In a system for applying a torque force to a workpiece, including a tool for engaging the workpiece and a driving system for said tool, the improvement comprising: sensor means for generating an electrical signal proportional to the torque being applied by the tool to the workpiece during a torquing operation; means for terminating operation of the driving system when the torque exerted by the tool on the workpiece exceeds a predetermined maximum value; means for generating electrical signals during the torquing operation proportional to the peak torque applied by the tool to the workpiece during the previous section of the torquing operation; means for comparing said electrical signals proportional to the peak torque applied by the tool to the workpiece during the previous torquing operation to the signal indicating the torque being applied by the tool to the workpiece; and means for generating an electrical signal portional to the time, during the torquing operation, in which the signal indicating the torque being applied by the tool to the workpiece exceeds the signal indicating the maximum previous torque applied by the tool to the workpiece and for recording the time during which said condition exists.

7. The method of evaluating a torquing operation performed by a driving tool on a workpiece comprising establishing minimum and maximum limits for the time during a torquing operation in which the torque exerted by the tool on the workpiece exceeds the previous maximum torque exerted by the tool on the workpiece during the torquing operation; recording the time during a torquing operation in which the torque instantaneously applied by the tool to the workpiece exceeds the previous maximum torque exerted by the tool on the workpiece during said torquing operation; and comparing said recorded time to said minimum and maximum times.

* * * * *